M. SCHWERIN.

Casters for Trunks.

No. 5,776. Reissued March 3, 1874.

WITNESSES.
W. W. J. Murphy.
J. H. Garner.

INVENTOR.
Morris Schwerin
per
F. A. Lehmann, Atty.

AM. PHOTO-LITHOGRAPHIC Co. N. Y. (OSBORNE'S PROCESS.)

UNITED STATES PATENT OFFICE.

MORRIS SCHWERIN, OF NEWARK, NEW JERSEY.

IMPROVEMENT IN CASTERS FOR TRUNKS.

Specification forming part of Letters Patent No. 108,193, dated October 11, 1870; reissue No. 5,776, dated March 3, 1874; application filed February 14, 1874.

*To all whom it may concern:*

Be it known that I, MORRIS SCHWERIN, of Newark, in the county of Essex and State of New Jersey, have invented certain new and useful Improvements in Trunk-Rollers; and I do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention relates to an improvement in casters for trunks; and it consists in making an opening through the cleat, and passing the roller down through it, so as to protect the roller from injury.

Figure 1:
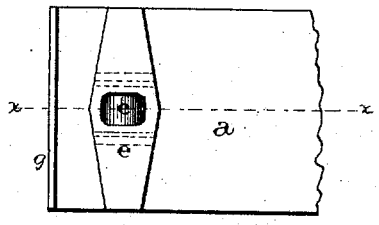
Figure 2:
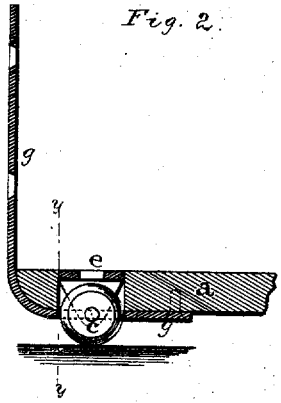
Figure 3:
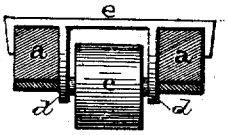

Figure 1 is a plan view of a portion of a cleat to which my invention is applied. Fig. 2 is a section of the same, taken on the line *x x*, Fig. 1; Fig. 3, a cross-section of the cleat, taken on the line *y y*, Fig. 2.

*a* represents an ordinary cleat, such as is attached to the bottom of trunks, chests, and boxes, and which has an opening made through it, as shown in Fig. 2, through which the roller *c* is passed. This roller is pivoted between the two ears *d*, which project downward from the under side of the plate *e*, which is secured to the top of the cleat, and which roller extends down below the bottom of the cleat sufficiently far to allow the trunk or box to be freely rolled around, while the upper part of the roller is inclosed within the cleat. The plate *e* may extend entirely across the top of the cleat, and have its two ends bent downward so as to clasp its sides, and thus secure the two parts more firmly together, or the plate need not extend beyond the two ears *d*, my object being to simply form a frame in which to pivot the roller. Secured to the sides of the trunk, and extending down under the cleat, is a strap, *g*, which has an opening made through it, through which the roller passes. This strap serves to strengthen the corner of the trunk, and, by bearing against the ends of the rivet, upon which the roller turns, prevents the rivet from coming out, and at the same time strengthens the roller.

By thus passing the roller down through the cleat, the plate to which the roller is attached cannot be twisted loose by the constant side strains, the rivet is prevented from coming out, and the roller and its frame protected from injury.

I am aware that it is not new to embed the top of the roller in the bottom of the trunk, and I do not therefore claim such broadly.

Having thus described my invention, I claim—

1. The combination of a mortised cleat and a caster-frame, the frame of the caster being passed through the cleat from the inside, and fastened or held at a point within the outer surface of the same, and between the trunk and the cleat, substantially in the manner and for the purpose set forth.

2. The combination of the cleat, roller, and its frame, and independent strap, the parts being arranged for operation as shown and described.

In testimony that I claim the foregoing I have hereunto set my hand this 13th day of February, 1874.

MORRIS SCHWERIN.

Witnesses:

HERMANN HIRSCH,
EDUARD SIMON.